US 6,746,066 B2

(12) United States Patent
Reed (10) Patent No.: US 6,746,066 B2
(45) Date of Patent: Jun. 8, 2004

(54) TRUCK BED EXTENSION

(76) Inventor: Harry F. Reed, 101 River Ridge, Cedar Falls, IA (US) 50613

( * ) Notice: Subject to any disclaimer, the term of this patent is extended or adjusted under 35 U.S.C. 154(b) by 0 days.

(21) Appl. No.: 10/305,412

(22) Filed: Nov. 26, 2002

(65) Prior Publication Data

US 2003/0127873 A1 Jul. 10, 2003

Related U.S. Application Data

(63) Continuation-in-part of application No. 09/669,342, filed on Sep. 26, 2000, now Pat. No. 6,513,850, which is a continuation-in-part of application No. 09/510,040, filed on Feb. 22, 2000, now Pat. No. 6,155,622.

(51) Int. Cl.⁷ .............................................. B62D 33/037
(52) U.S. Cl. ................................. 296/26.08; 296/57.1
(58) Field of Search ......................... 296/26.08, 26.11, 296/57.1; 224/402–404

(56) References Cited

U.S. PATENT DOCUMENTS

| | | | | |
|---|---|---|---|---|
| 4,778,213 A | * | 10/1988 | Palmer | 296/26.11 |
| 5,004,287 A | * | 4/1991 | Doyle | 296/57.1 |
| 5,658,033 A | * | 8/1997 | Delaune | 296/57.1 |
| 5,857,724 A | * | 1/1999 | Jarman | 296/26.11 |
| 6,179,360 B1 | * | 1/2001 | Davian | 296/26.11 |
| 2001/0005085 A1 | * | 6/2001 | Bauer | 296/26.08 |

* cited by examiner

*Primary Examiner*—Dennis H. Pedder
(74) *Attorney, Agent, or Firm*—Shook, Hardy & Bacon L.L.P.

(57) ABSTRACT

A truck bed extension is provided for extending the useful length of a pickup truck bed. The truck bed extension includes a pair of spaced, longitudinally extending sidewalls interconnected by a transversely extending gate. The sidewalls are adapted to mount to the truck bed using the existing hardware on found on the truck bed walls and on the tailgate. A hinge assembly swingably mounts the gate onto the side walls for movement of the gate between a generally upright, closed position and a downward, open position, and when the gate is in its open position, it can be retracted toward the truck bed to avoid interference with cargo loading and unloading.

15 Claims, 8 Drawing Sheets

TRUCK BED EXTENSION

RELATED APPLICATION

This is a Continuation in Part of U.S. Ser. No. 09/669,342, filed Sep. 26, 2000, now U.S. Pat. No. 6,513,850 which is a Continuation in Part of U.S. Ser. No. 09/510,040, filed Feb. 22, 2000, now issued as U.S. Pat. No. 6,155,622. The applications and the patent are all in the name of the same applicant of this application.

BACKGROUND OF THE INVENTION

1. Field of Invention

This invention broadly concerns a truck bed extension which can be readily mounted and detached from a conventional pickup truck bed. More particularly, it is concerned with a truck bed extension which may be coupled to the truck bed and tailgate for increasing the effective length of the truck bed. The extension attaches to the existing tailgate latching hardware without the need for modification.

2. Background of the Invention

Pickup trucks have become a common conveyance for many people in lieu of an automobile. They have the ability to carry cargo and in recent years, many trucks include added passenger seating. In many instances, pickup truck manufacturers wish to avoid increasing either the wheelbase or the overall length of the truck when further seating capacity is added. As a result, the manufacturer often shortens the truck bed of the pickup. Unfortunately, the result is a reduced cargo-carrying capacity. While traditional pickup truck beds have had a length of about 8 feet in order to carry, for example, standard dimensioned lumber and plywood of that length, many current pickup truck bed lengths are reduced to six feet or even four feet. As a consequence, many articles can no longer be successfully transported in the shortened bed.

Several attempts have been made to develop a suitable truck bed extender, and are shown for example in U.S. Pat. Nos. 5,658,033; 5,755,480; 5,816,637 and 5,820,188. However, a problem common to the teachings of each of these designs is their inability to be mounted and readily detached from standard pickup truck bed latching assemblies, and, therefore, may require the truck bed to be modified from its existing structure. This detracts from the use of the truck in its manufactured state when no extension is desired. Furthermore, prior art designs lack the combination of a secure attachment to both the bed and the tailgate, and there is a need for an attachment which can be mounted by one person without the use of tools.

There has thus developed a need for a pickup truck bed extension which can be readily mounted and detached from the bed of a pickup having conventional latching mechanisms. There has further developed a need for a pickup truck bed extension which requires no modification of the truck bed itself, and thus can be used by a pickup truck owner who either lacks the desire or the skills necessary to alter the truck as originally manufactured.

U.S. Ser. No. 09/699,342, of which this is a continuation in part, and U.S. Pat. No. 6,155,622, of which that application is a continuation in part, address almost all of these needs—the pickup truck bed extension disclosed therein can be readily mounted and detached from the bed of certain pickups having conventional latching mechanisms, without modification of the truck itself or the addition of hardware. However, the pickup truck bed extension of U.S. Ser. No. 09/510,040 is not suitable for use with all pickup trucks. Pickup trucks manufactured by GMC® and Chevrolet®, for example, have latching mechanisms that will not accept the pickup truck bed extension of U.S. Ser. No. 09/510,040. A need therefore existed for a pickup truck bed extension adapted to be used with pickup trucks having latching mechanisms that are incompatible with the extension shown in U.S. Ser. No. 09/510,040—and in particular an extension that may be used with pickup trucks of the type manufactured by GMC® and Chevrolet®.

In addition to the extensions of U.S. Pat. No. 6,155,622 and U.S. Ser. No. 09/699,342, there remains a need for improvements in the areas of structural integrity, maximum expansion area, and operation of the gate hinge. With respect to structural integrity, because the sidewalls in the embodiments of each of these inventions are only supported at certain points, rather than a more continuous support, structural integrity is not maximized. With respect to maximizing the area of expansion, the extension gates of these embodiments are hinged at or directly below the end of the open tailgate. These hinge positions were necessary so that the gate would not interfere with the attachment of ramps used to load items into the bed. When a ramp is used, it is undesirable for the extension to bear the weight. Instead the weight should be borne by the more supportive pickup tailgate, requiring the hinge to be positioned exactly at the end of the open tailgate so that the ramp can be brought into contact with the outermost edge of the opened tailgate. This effectively limits the expansion length created by the extension to the length of the open tailgate. With respect to the operation of the gate hinge, when the hinge is position at the end of the open tailgate, it can sometimes interfere with the loading and unloading of items into the truck bed. Therefore, there is a need in the art for an extension that has enhanced structural integrity, is not limited by the length of the open tailgate, and reduces potential interference from either the gate hinge or the gate, while still providing the ability to use ramps to load or unload items.

SUMMARY OF THE INVENTION

These and other objects have been met by the truck bed extension of the present invention. That is to say, the truck bed extension hereof can be securely coupled to the existing latching mechanism of a pickup truck bed and tailgate, requires no additional tools, is relatively light in weight and easy to handle, and can be readily mounted and detached without altering the configuration provided by the manufacturer.

The truck bed extension hereof is particularly designed to be mounted on a pickup truck bed having a deck and upright bed walls. The bed walls of the typical pickup include upright end portions at the rear thereof, each end portion mounting opposed, inwardly extending generally horizontal posts. In addition, the tailgate is provided with releasable latches on each side thereof. Thus, in ordinary operation, the tailgate swings on a generally horizontal axis and when upright, the latch mechanisms at each side thereof receive the posts on the bed and hold the tailgate in an upright, closed position. By actuating a handle operatively coupled to the latching mechanisms in the tailgate, the tailgate is released and may be swung downwardly to a generally horizontal orientation, supported by a cable or linkage.

By taking advantage of these standard features, the truck bed extension hereof accomplishes the objects set forth above. The extension includes a pair of laterally spaced, generally upright sidewalls and a transverse gate coupled therebetween. The sidewalls include lower rails which are provided with mating hardware which is positioned and configured for insertion into the latching mechanisms. The mating hardware is positioned on the lower rails so that upright pillars on the sidewalls are adjacent the upright rear portions of the pickup truck bed. U-shaped brackets are positioned on the pillars to receive posts or other hardware mounted on the pickup as standard by the manufacturer. The brackets and the mating hardware effectively lock the truck bed extension in place and resist movement thereof in each of three orthogonal axes. The truck bed extension may be quickly removed simply by actuating the handle on the tailgate of the pickup to release the mating hardware and then lifting the brackets off of the hardware extending inwardly from the bed. The truck bed extension preferably includes a safety support to prevent the extension from falling off of the truck during transit, and the extension may have tubular steel, solid or mesh walls, using the tailgate itself as the floor of the extension.

Another novel aspect of the invention is its improved extension gate hinge arrangement. When this extension gate is positioned on the truck bed with the tailgate in its open, generally horizontal orientation, the sidewalls extend beyond the end of the tailgate. The hinge arrangement is positioned on each side wall adjacent the portion of each lower rail which extends beyond the end of the tailgate. The hinge arrangement includes a retaining member to enable the gate, when unlatched and hanging downwardly in an essentially vertical orientation, to be slid or retracted toward the pickup bed to eliminate possible interference with any ramp or other load bearing device being used to load items into, or unload items from, the bed. Specifically, by sliding or retracting the gate toward the pickup bed, loading ramps or the like can be brought into direct contact with the outermost edge of the opened tailgate to ensure that the tailgate, and not the extension, bears the weight of items being placed into or removed from the truck bed. This arrangement also allows the area of expansion to extend beyond the ultimate length of the open tailgate.

In accordance with one embodiment of the present invention, a truck bed extension for mounting to a pickup truck is disclosed. The truck bed extension comprises, in combination, a pair of opposed, substantially upright, longitudinally extending side walls, each side wall including a top having opposed ends thereof, a bottom having opposed ends thereof, a front edge extending between the top and bottom, and a rear edge extending between the top and bottom; a gate including a top having opposed ends thereof, a bottom having opposed ends thereof, and a pair of sides extending therebetween; a mounting member positioned adjacent the front edge of at least one side wall and adapted to removable engage a back end of the pickup truck; a hinge assembly coupled with the bottom of each side wall adjacent the rear edge, the hinge assembly including a retaining member; a pin adjacent each opposed end of the gate bottom and extending outwardly therefrom, wherein each pin has a proximate end and a distal end, wherein the distal end is adapted to be received and engaged by the retaining member to thereby swingably couple the gate between the opposed side walls; and at least one latching assembly positioned adjacent an opposed end of the gate top, and adapted to releasably secure the gate to an adjacent side wall in a closed, essentially upright orientation. The retaining member of the hinge assembly further includes a slide bar portion adapted to allow forward and rearward movement of the pin when the pin is engaged by the retaining member, wherein the hinge assembly allows the gate, when in its open, downwardly oriented position, to be slid or retracted toward the pickup bed. These and other advantages will be readily apparent to those skilled in the art with reference to the drawings and the description which follows.

BRIEF DESCRIPTION OF THE DRAWINGS

FIG. 20 is a detailed perspective view of the hinge arrangement of the third embodiment when the gate is hanging down from the side walls in the open position, with the gate slid toward the truck in order to avoid interference with a ramp or the like.

DETAILED DESCRIPTION OF THE PREFERRED EMBODIMENTS

Referring now to FIGS. 1–5, one embodiment of a truck bed extension 10 of the present invention broadly includes first and second generally upright sidewalls 12 and 14 which are spaced in parallel planes and connected by a bar 16 which transversely spaces the sidewalls 12 and 14 to lie in generally parallel planes extending rearwardly from a truck bed 18 of a pickup truck. The bar 16 also pivotally mounts a rear gate 20, the bar 16 being positioned to lie preferably rearwardly of the tailgate 22 of the pickup so that the rear gate 20 is free to swing downwardly below the bar 16 without interference from the tailgate 22. A fastening member 24 is provided on the rear gate 20 to releasably couple it to the sidewalls and hold it in a closed, upright position between the sidewalls 12 and 14.

In greater detail, the sidewalls 12 and 14 each include a lower side rail 26 defining a lower sidewall margin, an upright front pillar 28 defining a front sidewall margin, an upright rear pillar 30 defining a rear sidewall margin, an upper side rail 32 defining an upper sidewall margin, and side enclosure 34 to enclose the area within the pillars and the rails of each sidewall 12 and 14. The pillars 28 and 30 and side rails 26 and 32 are preferably provided of tubular steel or aluminum for light weight, ruggedness of construction and the ability to interconnect by welding. Preferably, the pillars and rails will be welded together at their ends, with the enclosure welded thereon to provide a rigid sidewall.

Figures 1, 2:
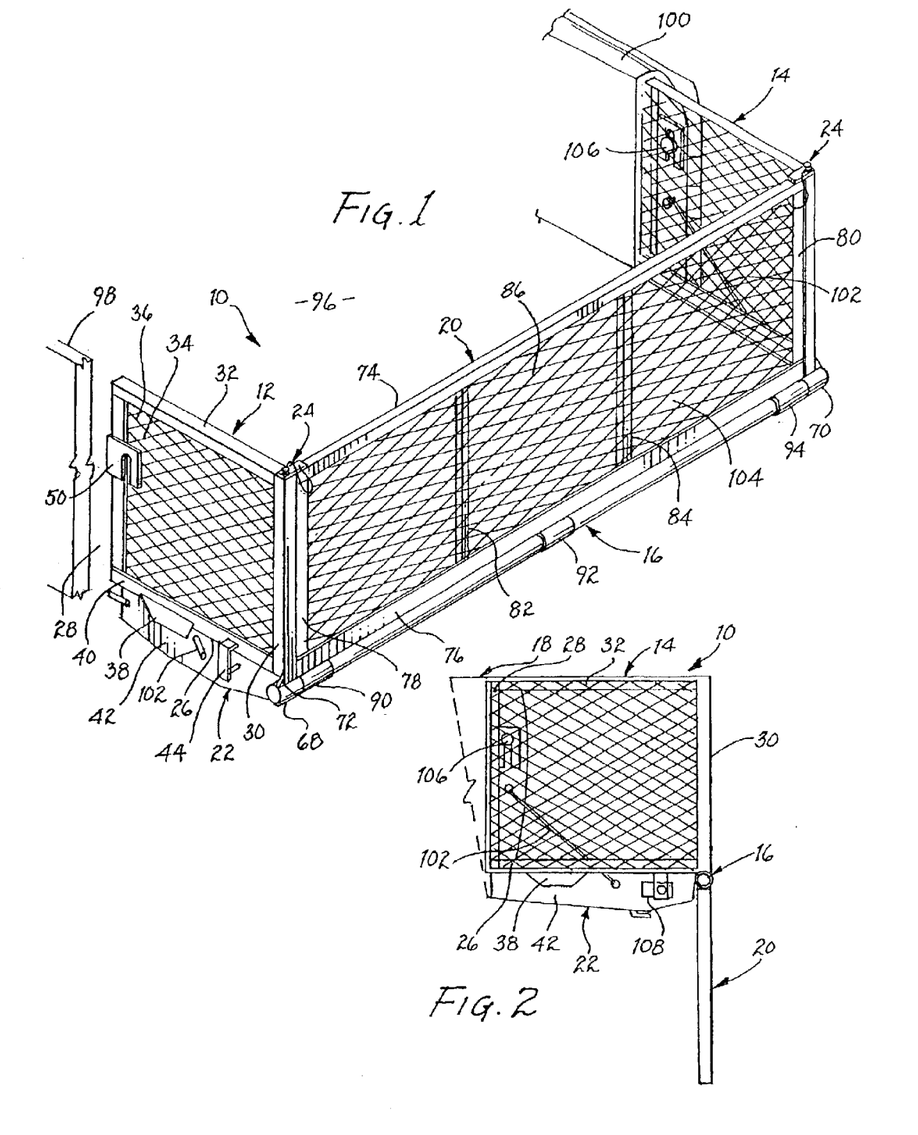
FIG. 1 is a perspective view of the truck bed extension shown mounted to the bed of a pickup truck, the truck bed being shown as a fragmentary diagrammatic view.
FIG. 2 is a side elevational view showing the truck bed and tailgate to which the truck bed extension is mounted.
Figures 4, 5:
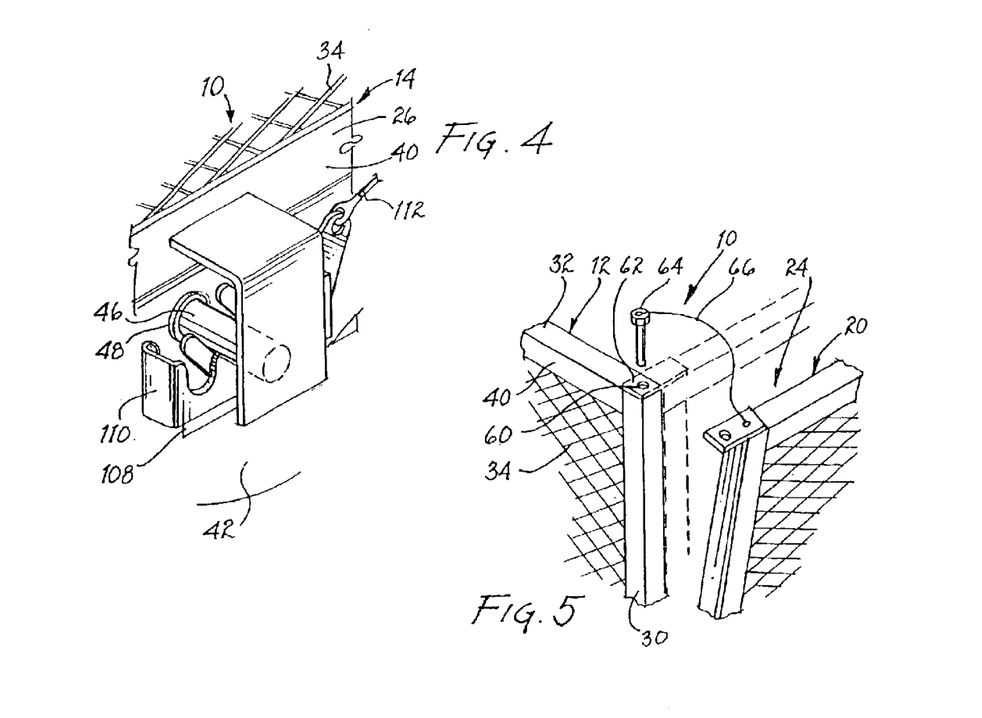
FIG. 4 is an enlarged, fragmentary perspective view showing the pin extending inwardly from a mount which extends downwardly from the lower side rail of the truck bed extension sidewalls.
FIG. 5 is an enlarged, fragmentary perspective view showing the rear gate of the truck bed extension and the fastening member for holding it in position.

The enclosure 34 may be of expanded metal mesh 36, as shown, or alternatively of sheet metal or tubular steel. The sidewalls each have an outboard side 40. The lower side rail 26 includes a guide flange 38 extending downwardly from the outboard side 40 of each of the lower side rails 26 to engage the sides 42 of the tailgate 22 and resist lateral movement of the truck bed extension 10. Additionally, the lower side rails 26 each carry a downwardly extending L-shaped mount 44 which include an inwardly extending pin 46. Thus, the pin 46 of sidewall 12 will be opposite and extend toward the pin 46 of the sidewall 14, and the pin 46 of sidewall 14 will be opposite and extend toward the pin 46 of sidewall 12. The pins 46 of each sidewall 12 and 14 thus are substantially co-linear and lie in a substantially horizontal plane when the truck bed extension is mounted, each pin 46 including a terminal flange 48 to aid in preventing slippage of the pin 46 when mounted to the tailgate 22.

Figure 3:
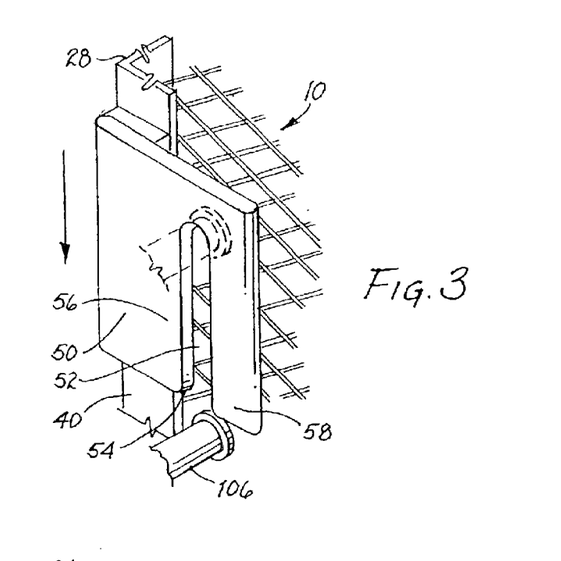
FIG. 3 is an enlarged, fragmentary perspective view showing the mounting bracket on the truck bed extension receiving a post which extends inwardly from the bed wall of the truck.

The front pillars 28 of each sidewall 12 and 14 include a U-shaped side bracket 50 on the outboard side 40 thereof. The brackets 50 thus present a slot 52 open at its lower end 54, with the brackets 50 on each sidewall 12 and 14 being positioned to lie in the same, substantially horizontal plane. The brackets 50 thus include a front leg 56 and a rear leg 58 which inhibit front and rear movement of the truck bed extension 10 when mounted.

The rear pillars 30 of each sidewall 12 and 14 include a hole 60 in the upper end 62 thereof. The fastening member 24 includes a pin-like bolt 64 attached by a wire 66 to the rear gate 20, with the bolt 64 removably received in the hole 60 to hold the rear gate 20 in a closed position. A mounting bracket 65 is attached to each edge of the rear gate 20 and provided with an aperture which is in registry with the hole 60 when the rear gate 20 is in an upright, closed position, whereby bolt 64 may secure the mounting bracket to the rear pillars of the respective sidewalls.

The bar 16 is preferably a tubular steel cylinder having a circular outer surface with end caps 68 and 70 welded thereto. A gusset plate 72 is welded to each cap and its corresponding rear pillar 30 to provide additional reinforcement and rigidity and to maintain the sidewalls 12 and 14 in an upright orientation.

The rear gate 20 includes upper beam 74 and lower beam 76 positioned in spaced-apart, substantially parallel planes. The beams 74 and 76 are interconnected by side stanchions 78 and 80 respectively adjacent the side walls 12 and 14, and optional additional support is provided by intermediate braces 82 and 84. The beams 74 and 76 are welded to the side stanchions 78 and 80 and also to the braces 82 and 84, with a back enclosure 86 provided to inhibit material received in the truck bed from passing rearwardly therepast. To minimize air resistance when the truck is in motion, the back enclosure 86 may be of expanded metal mesh 36 as shown, but alternatively the back enclosure may be provided as a sheet metal panel or may be of tubular steel. The rear gate 20 is preferably swingably mounted to the bar 16 by circular bearings 90, 92 and 94 which are welded onto the lower beam 76 at laterally spaced intervals.

The truck bed extension 10 hereof is especially designed to be mounted to a pickup truck bed 18 having a generally horizontal deck 96 and a pair of spaced apart bed walls 98 and 100. The bed 18 includes hinges which swingably mount the tailgate 22 for movement about a generally horizontal axis. At least one of the bed walls 98 and 100 are typically connected to the tailgate 22 by a retainer, such as a cable 102 or arm, which maintains the tailgate 22 in a generally horizontal position when opened as shown in FIG. 2. In this position, the interior wall 104 of the tailgate 22 is substantially co-planar with the deck 96 of the truck bed.

In certain vehicles, the bed walls 98 and 100 each include, at a predetermined location on the rear portions thereof, opposed, inwardly extending posts 106, preferably with terminal flanges. The posts 106 are sized, configured and located to slide into openings 108 in respective sides of the tailgate 22, the openings 108 each having latches 110 positioned therein to receive the posts 106 when the tailgate 22 is closed by swinging it into a generally vertical position. The latches 110 are thus positioned at a predetermined position on the tailgate to cooperate with the posts 106. The tailgate 22 is typically provided with a shiftable handle which is operatively coupled to the latches 110 by an arm, cable 112 or the like. Thus, the user lifts or otherwise shifts the handle to open the latches 110 which permits opening of the tailgate 22.

The truck bed extension 10 hereof advantageously positions the brackets 50 and the pins 46 to hold the extension onto the tuck bed. The brackets 50 are positioned on the front pillars 28 so that the lower side rails 26 are proximate to or supported by the tailgate 22, the posts 106 received in the slots 52, and the pins 46 releasably coupled to the latches 110. In this position, the bar 16 is positioned just rearwardly and below the interior wall 104 of the tailgate 22. With the rear gate swung downwardly in an open position, cargo received on the deck 96 of the truck bed can slide rearwardly across the tailgate 22 without interference by the bar 16. Additionally, the sidewalls 12 and 14 extend rearwardly from the recessed rear portions of the truck bed 18 and in overlapping relationship, the front pillars 28 essentially occupying the space within the recessed rear portions of the truck bed where the tailgate 22 originally connected to the bed walls 98 and 100. The attachment of the truck bed extension 10 is simplified by the fact that only vertical movement of the extension 10 onto the truck bed 18 is required. With the tailgate 22 open to serve as the floor of the extension 10, lowering of the brackets 50 onto the posts 106 while the pins 46 are lowered and locked onto the latches 110 completes the mounting operation. Removal of the extension 10 requires only that the handle on the tailgate 22 be pulled to cause the cable 112 or the like to trip the latch release lever and thereby permit the spring loaded receiver to pivot, thereby opening the latches to free the pins 46 and enable lifting of the extension in a vertical direction. This can be accomplished by one person when a hoist or pulley system is attached to the extension as an aid to raising and lowing.

When mounted to the truck bed 18, the sidewalls 12 and 14 extend rearwardly and lie in substantially the same upright parallel planes as the bed walls 98 and 100. Thus, without the necessity of additional fittings or hardware being permanently coupled to the truck bed 18, its length can be functionally extended for temporary periods, with the advantage that it can be quickly returned to its original condition without any holes or permanent modifications.

Referring now generally to FIGS. 6–14, an extension 200 representing another embodiment of the present invention is shown. The extension 200 broadly includes first and second generally upright sidewalls 212 and 214 and a rear gate 220. The first and second generally upright sidewalls 212 and 214 are dimensioned to be connected by the rear gate 220 which transversely spaces the sidewalls 212 and 214 to lie in generally parallel planes extending rearwardly from a truck bed 218 of a pickup truck.

In greater detail, the sidewalls 212 and 214 each include a lower side rail 226 defining a lower sidewall margin, an upright front pillar 228 defining a front sidewall margin, a substantially L-shaped pillar 230 defining a rear and upper sidewall margin, and side bars 234 to enclose the area within the pillars and the rails of each sidewall 212 and 214. The pillars 228 and 230, side rail 226, and side bars 234 are preferably provided of tubular steel or aluminum for light weight, ruggedness of construction and the ability to interconnect by welding. (Alternatively, the side rails 226 may be replaced with expanded metal mesh as shown above in FIGS. 1–2, or with sheet metal.) Preferably, the pillars, rails, and bars will be welded together at their ends.

Figure 7:
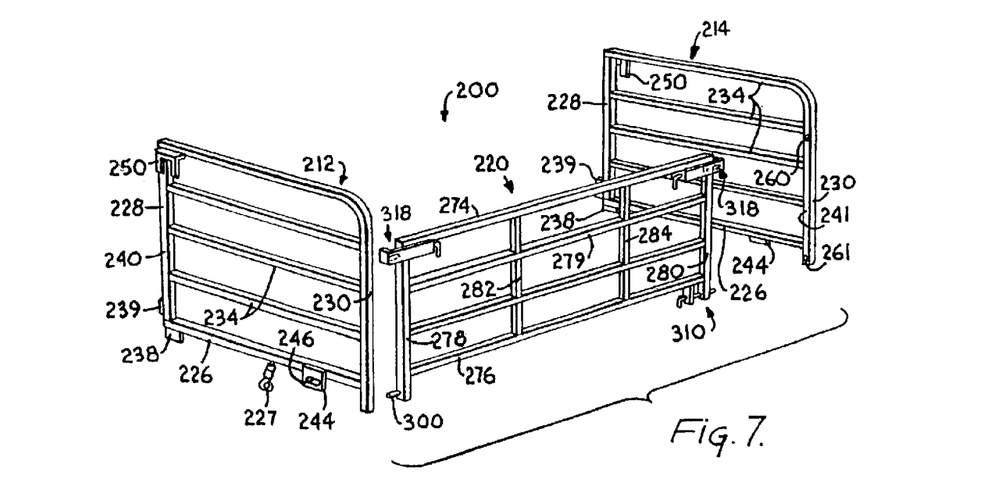
FIG. 7 is a perspective, exploded view of the truck bed extension of FIG. 6.

The sidewalls each have an outboard side 240. The lower side rails 226 each include a guide flange 238 extending downwardly from the outboard side 240 to engage the sides 242 of the tailgate 222 and resist lateral movement of the truck bed extension 200. Additionally, the lower side rails 226 each carry a downwardly extending tongue 244, which includes a four-sided opening 246 therein. Still further, the lower side rails 226 include a safety chain and clasp 227, which can be coupled to the tailgate 222 so as to prevent the truck bed extension 200 from accidentally falling off of the truck during transit.

Figures 8, 9, 10, 11, 12:
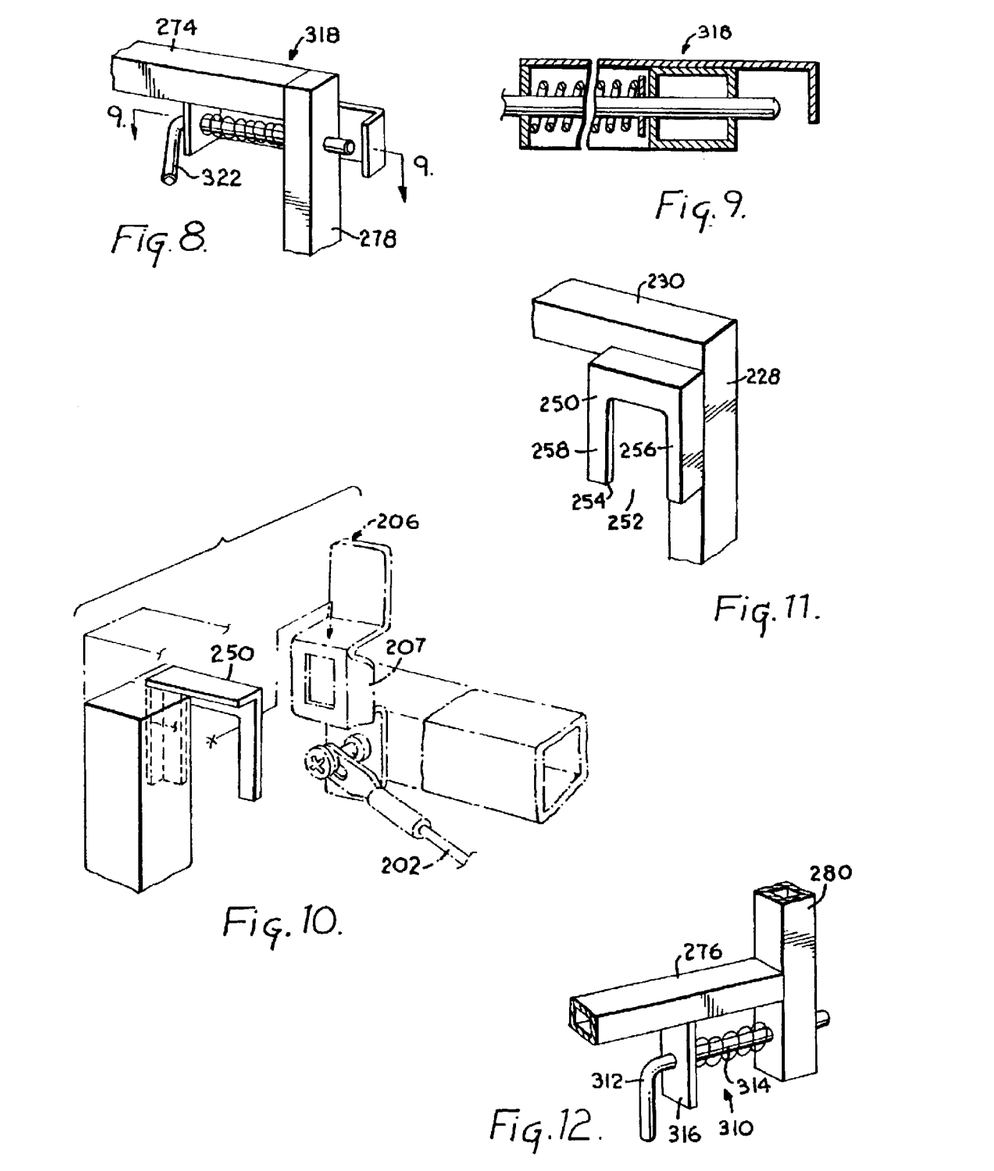
FIG. 8 is a perspective view of the rear gate latch of the truck bed extension of FIG. 6.
FIG. 9 is a cross-sectional view of the rear gate latch of FIG. 8, taken along line 9—9 of FIG. 8.
FIG. 10 is a perspective view of the side bracket of the truck bed extension of FIG. 6, illustrating the mounting of the side bracket onto the truck.
FIG. 11 is a perspective view of the side bracket of the truck bed extension of FIG. 6.
FIG. 12 is a perspective view of the spring-loaded pin at the base of the rear gate of the truck bed extension of FIG. 6.

The front pillars 228 of each sidewall 212 and 214 include a U-shaped side bracket 250 on the outboard side 240 thereof. The brackets 250 thus present a slot 252 open at its lower end 254, with the brackets 250 on each sidewall 212 and 214 being positioned to lie in the same, substantially horizontal plane. The brackets 250 thus include a front leg 256 and a rear leg 258 which inhibit front and rear movement of the truck bed extension 200 when mounted. Additionally, the front pillars 228 of each sidewall 212 and 214 each includes a guide flange 239 extending forward from the outboard side 240 to engage the interior portions of the truck bed walls 198 and 199.

Each L-shaped pillar 230 includes a hole 260 in the area of the upper rear sidewall margin and a hole 261 in the area of the lower rear sidewall margin on the inboard side 241 of the L-shaped pillars 230. As discussed below, the holes 260 and 261 are positioned to permit the attachment of the rear gate 200 to the sidewalls 212 and 214.

Turning now to the rear gate 220, it includes an upper beam 274 and lower beam 276 positioned in spaced-apart, substantially parallel planes. The beams 274 and 276 are interconnected by side stanchions 278 and 280 respectively adjacent the side walls 212 and 214, and optional additional support is provided by intermediate braces 282 and 284. The beams 274 and 276 are welded to the side stanchions 278 and 280 and also to the braces 282 and 284. Horizontal bars 279 enclose the area within the side stanchions 278 and 280. The pillars 228 and 230, side rail 226, and side bars 234 are preferably provided of tubular steel or aluminum for light weight, ruggedness of construction and the ability to interconnect by welding. (Alternatively, the horizontal bars 279 may be replaced with expanded metal mesh as shown above in FIGS. 1–2, or with sheet metal.)

The rear gate 220 is preferably removably and swingably mounted to the side walls 212 and 214. In this regard, the rear gate 220 features on side stanchion 278 an outwardly projecting pin 300, located so as to be insertable into and rotatable within hole 261 (not shown) on the first upright sidewall 212. Referring specifically to FIG. 7, on side stanchion 280 is located a spring loaded latching assembly 310, comprising an L-shaped pin 312, a spring 314 attached on one end to the L-shaped pin 312 and on a second end to the side stanchion 280 so as to maintain the L-shaped pin 312 in a closed position, and a mount 316 through which the L-shaped pin 312 is passed, so as to maintain the L-shaped pin 312 in proper alignment so that it may enter the hole 261 in the second upright sidewall 214.

Referring now to FIGS. 7–9, latching assemblies 318 are shown. The latching assemblies 318 are each coupled to an upper corner portion of the rear gate 220. Each latching assembly 318 comprises a U-shaped mount 320 coupled to each end of beam 274 and a side stanchion (278 or 280), and extending beyond the side stanchion so as to be able to clasp the outboard side 240 of the L-shaped pillar 230 when the rear gate 220 is attached to the sidewalls 212 and 214 and placed in a closed position. The latching assemblies 318 further comprise an L-shaped pin 322, a spring 324 attached on one end to the L-shaped pin 322 and on a second end to the side stanchion 278 or 280 so as to maintain the L-shaped pin 322 in a closed position. The latching assemblies 318 are positioned so that the L-shaped pins 322 may be inserted into holes 260.

When it is desired to mount the rear gate 220 to the sidewalls 212 and 214, the outwardly projecting pin 300 is inserted into hole 261 in side wall 212. Thereafter, the short leg of the L-shaped pin 312 is grasped and pulled in the direction of the side wall 212, so as to open the latching assembly 310. The side stanchion 280 is then moved into position along pillar 230 of side wall 214 on the inboard side 241 thereof, with the L-shaped pin 312 aligned with hole 261. Once proper alignment is achieved, the L-shaped pin 312 may be released so that it will enter hole 261. At this point, the bottom portion of the rear gate 220 is connected to the side walls 212 and 214.

The rear gate 220 may be secured in a closed position in the following manner. The short legs of the L-shaped pins 322 are grasped and pulled away from the nearest side stanchion 278 or 280, so as to open the latching assemblies 318. The side stanchions 278 and 280 are then moved into position along pillars 230 of side walls 212 and 214 on the inboard side 241 thereof, with the L-shaped pins 322 aligned with holes 260. Once proper alignment is achieved, the L-shaped pins 322 may be released so that they will enter holes 260.

Figure 6:
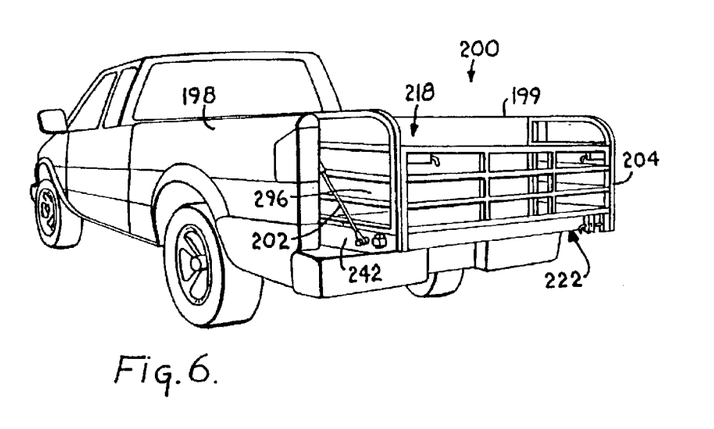
FIG. 6 is a perspective view showing another embodiment of the truck bed extension hereof mounted to the bed of a pickup truck.

The truck bed extension 200 hereof, like the extension 10, is especially designed to be mounted to a pickup truck bed 218 having a generally horizontal deck and a pair of spaced apart bed walls 198 and 199. The truck bed extension 200 differs from the extension 10 in that the truck bed extension 200 is specifically adapted to be coupled to a truck bed 218 of the type on GMC® and Chevrolet® pickup trucks, the tailgate hardware of which will not mate with the hardware on the extension 10.

The truck bed 218 includes hinges which swingably mount the tailgate 222 for movement about a generally horizontal axis. At least one of the bed walls 198, 199 such as a cable 202 or arm, which maintains the tailgate 222 in a generally horizontal position when opened as shown in FIG. 6. In this position, the interior wall 204 of the tailgate 222 is substantially co-planar with the deck 296 of the truck bed.

Figure 13:
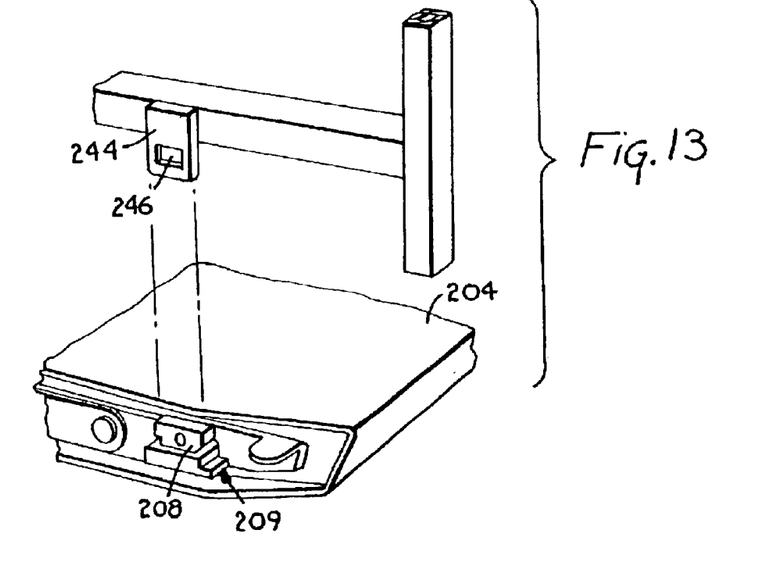
FIG. 13 is a perspective view showing the mating hardware at the base of one of the side walls of the truck bed extension of FIG. 6 and its insertion into the tailgate.

In certain pickup trucks manufactured by GMC® and Chevrolet®, the bed walls 198 and 199 each include, at a predetermined location on the rear portions thereof, opposed, inwardly extending male coupling devices 206, having a flange 207 (see FIG. 10) projecting rearwardly at a ninety degree angle in the direction of the tailgate 222. The male coupling devices 206 and flanges 207 are sized, configured and located so that the flanges 207 slide into openings 208 in female coupling devices 209 in respective sides of the tailgate 222, the female coupling devices 209 each having latches (not shown) positioned therein to receive the flanges 207 when the tailgate 222 is closed by swinging it into a generally vertical position. The female coupling devices 209 are thus positioned at a predetermined position on the tailgate 222 to cooperate with the male coupling devices 206. The tailgate 222 is typically provided with a shiftable handle which is operatively coupled to the latches (not shown) in the female coupling devices 209 by an arm, cable or the like. Thus, the user lifts or otherwise shifts the handle to open the latches which permits opening of the tailgate 222.

Figure 14:
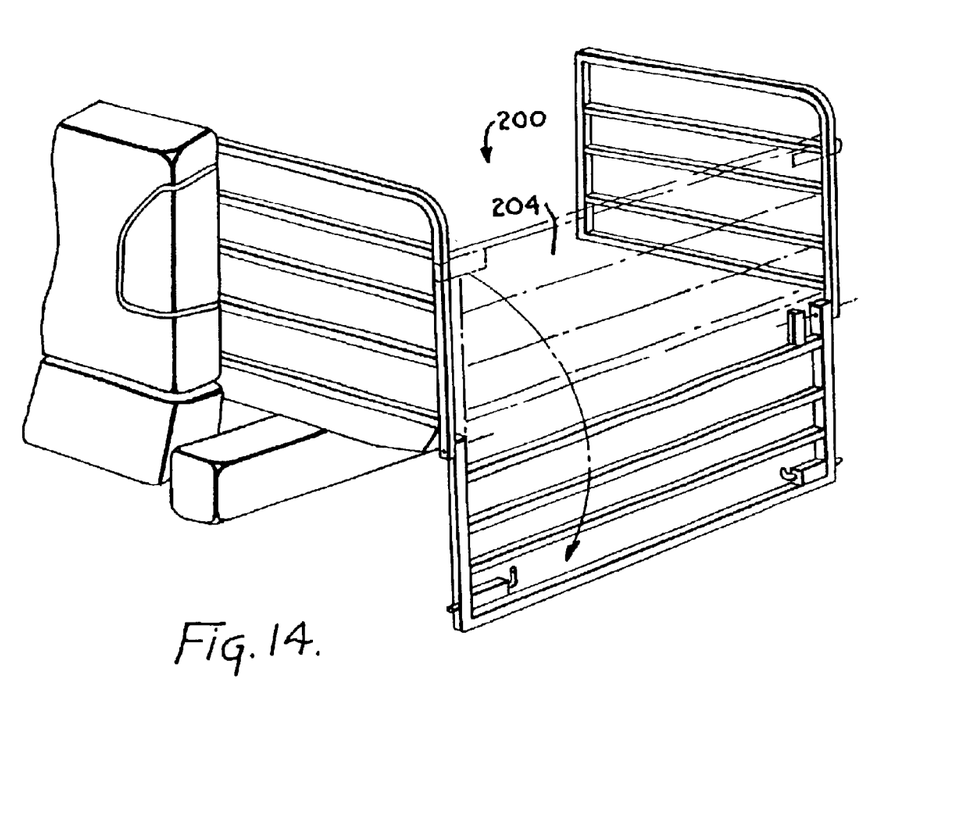
FIG. 14 is a perspective view of the truck bed extension of FIG. 6, with the tailgate in an open position.

The truck bed extension 200 hereof advantageously positions the brackets 250 and the extending tongue 244 (including its four-sided opening 246) to hold the extension onto the tuck bed. The brackets 250 are positioned on the male coupling devices 206 (see FIG. 10) so that the lower side rails 226 are proximate to or supported by the tailgate 222, and the extending tongues 244 are releasably coupled to the female coupling devices 209 through the openings 208. In this position, the bottom portions of pillars 230 and side stanchions 278 and 280 extend beyond the top of the tailgate 222. In this position, with the rear gate 220 swung downwardly in an open position, cargo received on the deck 296 of the truck bed can slide rearwardly across the tailgate 222 without interference by the rear gate 220. Additionally, the sidewalls 212 and 214 extend rearwardly from the recessed rear portions of the truck bed 218, the front pillars 228 essentially occupying the space within the recessed rear portions of the truck bed where the tailgate 222 originally connected to the bed walls 198 and 199.

The attachment of the truck bed extension 200 is simplified by the fact that only vertical movement of the extension 200 onto the truck bed 218 is required. With the tailgate 222 open to serve as the floor of the extension 200, lowering of the brackets 250 onto the male coupling devices 206 while the extending tongues 244 are lowered and locked into the female coupling devices 209 through the openings 208 completes the mounting operation. Removal of the extension 200 requires only that the handle on the tailgate 222 be pulled to cause the cable (not shown) or the like to trip the latch release lever and thereby opening the latches to free the extending tongues 244 and enable lifting of the extension in a vertical direction. This can be accomplished by one person when a hoist or pulley system is attached to the extension as an aid to raising and lowing.

When mounted to the truck bed 218, the sidewalls 212 and 214 extend rearwardly and lie in substantially the same upright parallel planes as the bed walls 198 and 199. Thus, without the necessity of additional fittings or hardware being permanently coupled to the tuck bed 218, its length can be functionally extended for temporary periods, with the advantage that it can be quickly returned to its original condition without any holes or permanent modifications.

Referring generally to FIGS. 15 through 25, a third embodiment of a bed expander 400 is shown. Extension 400 includes first and second sidewalls, 412 and 414 respectively, and a rear gate 420. Side walls 412 and 414 are adapted to releasably hold gate 420 and enable it to be swung down below and slid or retracted toward truck bed 418 and partially underneath the side walls 412, 414, so that gate 420 can be moved out of the way for purposes of loading or unloading the pickup. Side walls 412, 414 each have a lower side rail 426, an upright front pillar 428 and a L-shaped pillar 430. L-shaped pillar 430 includes a horizontal upper portion 431, a curved or bent portion 432, and a vertical lower rear portion 433. Side bars 434 extend within the area enclosed by the pillars and rails of each side wall 412, 414. Pillars 428, 430, lower side rails 426 and side bars 434 are preferably made of tubular steel or aluminum and interconnected by welding. This makes for a lightweight, durable construction ideal for hauling large objects, such as motorcycles, lawn mowers, or the like. Of course, other suitable materials and configurations which would help retain cargo in the truck bed and in the area of expansion could be used and are to be considered within the scope of this invention. For example, the side walls and rear gate could be molded of synthetic resin, glass reinforced resin, carbon fiber or other lightweight and rigid materials. Additionally, side bars 434 could be replaced with metal mesh as shown in FIGS. 1 and 2, or with a solid sheet of suitable material, such as sheet metal.

Figure 16:
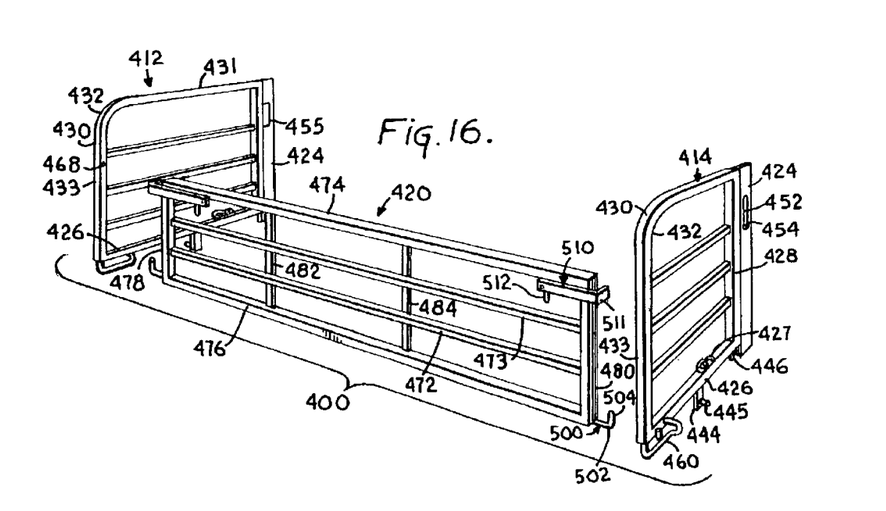
FIG. 16 is a perspective, exploded view of the truck bed extension of the third embodiment shown in FIG. 15.
Figure 25:
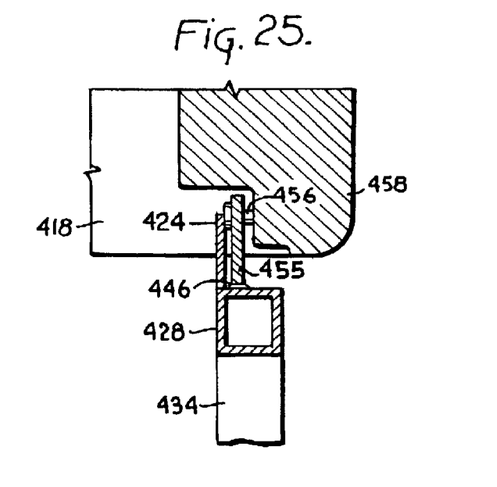
FIG. 25 is a cross-sectional view taken along line 25—25 in FIG. 17 showing the enlarged head of the extending post of a pickup being received between the flange and backplate of the coupling system of the invention.

In the coupling system of the third embodiment, each upright front pillar 428 has a flange 424 attached thereto. Each flange 424 engages the inside walls 458 of the pickup truck bed 418 to secure the upright pillars 428 to the back end of the pickup. Each flange 424 includes a slot 452 with a receiving hole 454 at the end. Each flange 424 can also include a back plate 455 defining slot 452 and receiving hole 454. Receiving hole 454 is larger than slot 452 so as to be able to receive an extending post 456 on the pickup bed. Extending post 456 has an enlarged head and a narrower shaft, wherein the enlarged head is adapted to be received by the receiving hole 454. In attaching side walls 412, 414, enlarged head is first placed within receiving hole, and then side walls 412, 414 are slid downwardly so that the narrow shaft of extending post 456 slides upwardly into the slot 452 to be securely retained.

Figure 22:
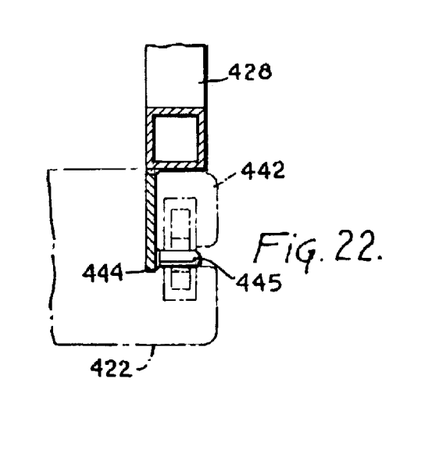
FIG. 22 is a cross-sectional view taken along line 22—22 in FIG. 17 showing the outwardly extending rod of the downwardly projecting mount received within a latch on a commercially available pickup.
Figure 23:
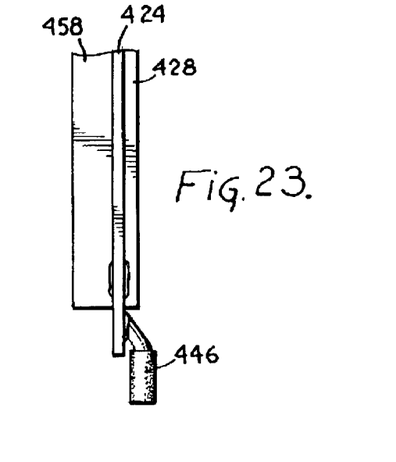
FIG. 23 is a cross-sectional view taken along line 23—23 in FIG. 17 showing the gap-shooting prong of the present invention.
Figure 24:
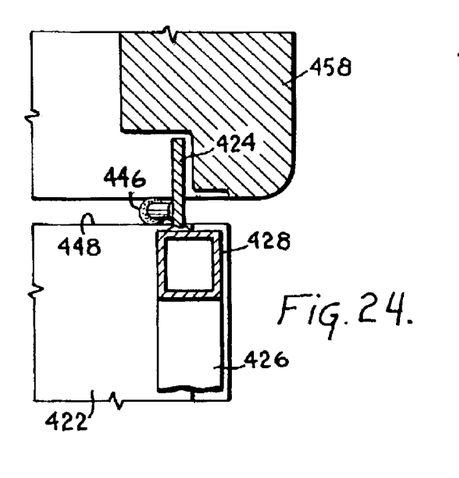
FIG. 24 is a cross-sectional view taken along line 24—24 in FIG. 17 showing the gap-shooting prong from above.

Side walls 412, 414 are also fixed at their lower side rails 426. Each lower side rail 426 has a downwardly projecting mount 444 with an outwardly extending rod 445. Similarly to the extender of the first embodiment, side walls 412, 414 can be releasably mounted when outwardly extending rod 445 is received by latch 442 on tailgate 422 of the pickup. This mounting configuration enhances the stability of side walls 412, 414. Side walls 412, 414 may then be released by the same mechanism with which tailgate 422 is opened or unlatched.

This embodiment also includes a safety chain and clasp 427, wherein clasp 427 is simply clipped onto the bed cable 436 of a commercially available pickup. Once attached, the safety chain and clasp 427 prevent extension 400 from accidentally falling off of the truck during transit.

Each L-shaped pillar 430 includes an aperture or receiving hole 468 positioned on vertical lower portion 433 adjacent curved portion 432. Each receiving hole 468 is adapted to receive an L-shaped pin 512, which is spring loaded by a latching assembly 510 that operates in the same manner as with the second embodiment, depicted in detail in FIGS. 7–9, and discussed in more detail below.

Rear gate 420 includes an upper beam 474 and a lower beam 476 which are substantially parallel to one another. Beams 474, 476 are interconnected at opposed ends thereof by side stanchions 478 and 480, which are adapted to be positioned adjacent side walls 412, 414, respectively, when gate 420 is in its closed, upright position. Additional support is provided by intermediate braces 482 and 484. Beams 474, 476 are attached to side stanchions 478, 480 and also to braces 482, 484. Horizontal bars 472 and 473 extend within the area defined by side stanchions 478, 480. Beams 474, 476, braces 482, 484, and bars 472, 473 are all preferably provided of tubular steel or aluminum so as to be rugged and lightweight for durable applications. These features are interconnected by welding or other suitable means. Of course, the use of other materials and means of connection are within the scope of this invention. Horizontal bars 472, 473 and/or braces 482, 484 may be replaced with metal mesh as described above in connection with other embodiments, or with a solid sheet of suitable material. Generally speaking, metal mesh is preferable for retaining smaller items within bed 418, whereas the use of horizontal bars is preferable for retaining larger, heavier objects.

Figure 18:
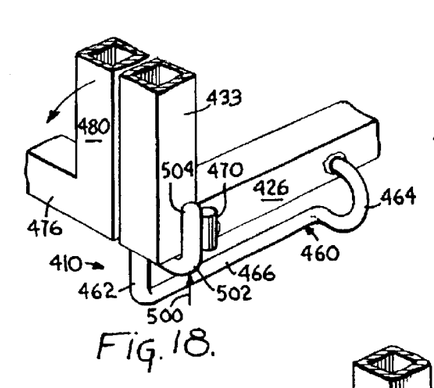
FIG. 18 is a detailed perspective view of the hinge arrangement of the third embodiment when the gate is in the closed position.
Figure 19:
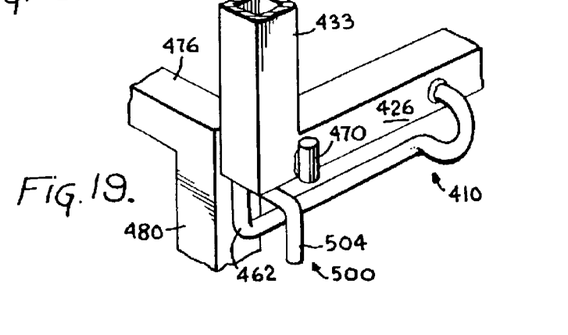
FIG. 19 is a detailed perspective view of the hinge arrangement of the third embodiment when the gate is hanging down from the side walls in the open position.
Figure 20:
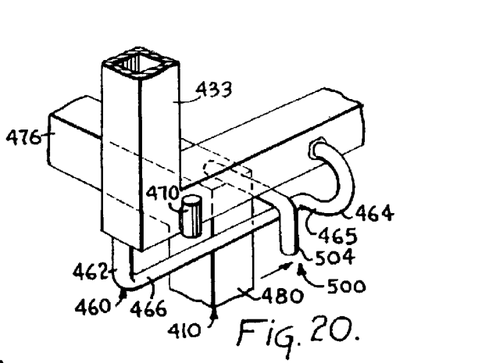

Gate 420 is rotatably mounted to side walls 412, 414 by way of a hinge assembly 410 which is shown in detail in FIGS. 18 through 20. Hinge assembly 410 includes a retainer member 460 which comprises a rear stop bar 462, a slide bar portion 466 and an outer loop portion 464. Member 460 is attached adjacent rear stop bar 462 to the bottom edge of the vertical lower portion 433 of the bent pillar 430, and adjacent outer loop portion 464 to the outer side of the lower side rail 426. Member 460 is adapted to receive an L-shaped hooking pin 500 extending outwardly from lower beam 476 of rear gate 420. Hooking pin 500 includes a bend 502 and a hooking finger 504. Mounted to the outer side of lower side rail 426 is a stopping tab 470, which provides a surface against which hooking finger 504 rests or stops when gate 420 is in its upright latched position (as will be described in more detail below).

Figure 15:
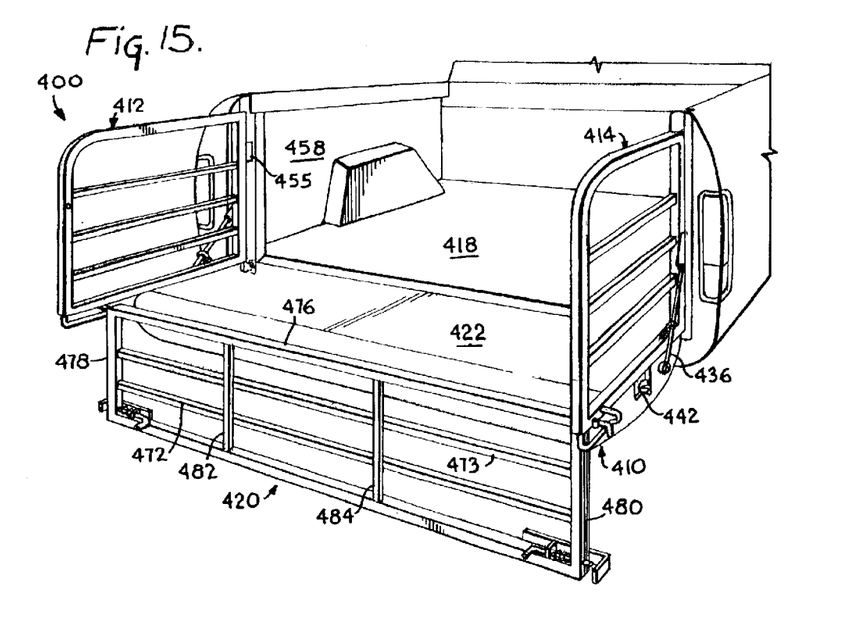
FIG. 15 is a perspective view showing a third embodiment of the truck bed extension mounted to the bed of a pickup truck.
Figure 17:
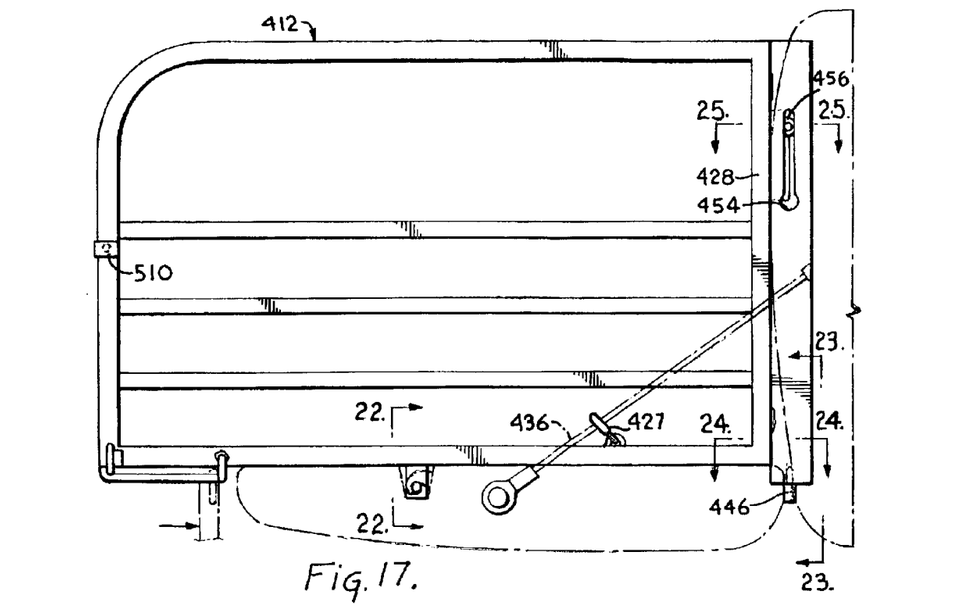
FIG. 17 is an enlarged side view showing the extension of the third embodiment, with on the truck bed and tailgate shown in phantom lines to illustrate the extension mounted thereon.

As is evident in FIGS. 15 and 17, side walls 412, 414 extend beyond the rearward end of opened tailgate 422, effectively increasing the additional square footage provided by extension 400 over that provided by previous extensions. This overhang also provides the necessary configuration for gate 420 to be selectively retracted below extension 400 and toward the truck bed 418, as discussed in detail below. As is apparent, hinge assembly 410 is positioned along lower side rail 426 adjacent the portion of lower side rail 426 which overhangs or extends beyond tailgate 422, in order to facilitate the selective retraction of gate 420 toward the truck bed 418.

Briefly, extension 400 is installed by first unlatching the pickup tailgate 422 to its open and essentially horizontal position, whereby it is retained in its horizontal orientation by bed cables 436. In this manner, tailgate 422 forms the bottom or floor for the largest portion of the expansion area. Next, side walls 412, 414 are mounted to the pickup bed walls 458. Finally, rear gate 420 is swingably attached to side walls 412, 414.

With respect to the unlatching step, tailgate 422 is opened by means original to the truck, typically by activating a lever to release latch 442 from extending post 456. Once tailgate 422 is unlatched and in its horizontal position, side walls 412, 414 are mounted thereon. This is accomplished by placing the enlarged head of the extending post 456 through receiving hole 454 on the flange 424 on each side wall 412, 414, and sliding side walls 412, 414 downwardly so that the post 456 effectively slides up into slot 452 to the upper portion thereof, locking the flange 424 onto the pickup. While sliding side walls 412, 414, the outwardly extending rods 445 on each downwardly projecting mount 444 are engaged by the latches 442 on the pickup, as depicted in FIG. 22. Also, at the same time, spacer 446 is received within a gap 448 between the bed 418 and tailgate 422, which is present in most commercially available pickups when tailgate 422 is in the open position. Spacer 436 can include a rubber coating to prevent it from damaging the paint on the tailgate 422 or truck bed 418, and serves to further hold and longitudinally support each side wall 412, 414. Side walls 412, 414 can be easily removed and disengaged from the latch by activating the handle on tailgate 422, releasing rod 455 from latch 442. FIGS. 15 and 17 illustrate that, when installed on the pickup truck, side walls 412, 414 extend beyond the length of the open tailgate 422.

Once both side walls 412, 414 are secured onto the bed walls 458 and tailgate 422, rear gate 420 may be rotatably attached therebetween. This is accomplished by holding rear gate 420 in a relatively horizontal orientation, wherein lower beam 476 is adjacent to and extends along the edge of tailgate 422. While holding gate 420 in this position, hooking pins 500 are placed through the respective retaining members 460 on each side wall 412, 414. Specifically, as can be seen in FIGS. 18–20, hooking finger 504 of hooking pin 500 is first placed through outer loop portion 464, and gate 420 is then slid forward, whereby hooking finger 504 catches and slidably rests on slide bar 466. A rear stop bar 462 provides a stopping mechanism to prevent the rearward movement of hooking pin 500, and thereby of gate 420. In this manner, when gate 420 is in its open position, it is able to slide forwardly and rearwardly along slide bar 466, with its forwardmost movement stopped by a back stop 465 on outer loop portion 464, as can be seen in FIG. 20. The rearwardmost movement of gate 420 is stopped by rear stop bar 462, as best seen in FIG. 19. FIGS. 19 and 20 show rear gate 420 in its vertical, downwardly oriented open position, as for loading, unloading or the like. If so desired when loading, gate 420 when in its downwardly vertical orientation can be slid forwardly until hooking pin 500 is stopped by backstop 465, as shown in FIG. 20. As can be seen by the phantom lines in FIG. 17, this enables rear gate 420 to be retracted underneath extension 400 toward pickup bed 418, so that rear gate 420 will not interfere with loading or unloading cargo, as when using a ramp or the like. This is especially effective for loading heavy equipment such as motorcycles, lawnmowers, and other items typically loaded by ramps.

Once items have been loaded into or unloaded from the pickup bed, rear gate 420 may be rotated upwardly into a vertical, upwardly oriented closed position and latched to secure the contents within bed 418. To close and secure gate 420, lower beam 476 is first slid backwardly away from pickup bed 418 until pin 500 is adjacent rear stop bar 462, into the position shown in FIG. 19. Gate 420 is then rotated upwardly, whereby hooking finger 504 rotates in a clockwise direction until it is in an upright position and rests against stopping tab 470, as shown in FIG. 18. Tab 470 limits the movement of pin 500, and thus gate 420, whereby gate 420 is oriented in an upright, vertical manner when in its closed position.

Figure 21:
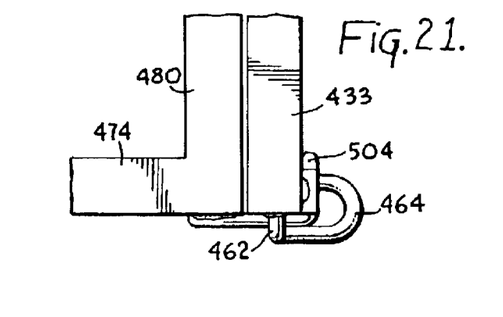
FIG. 21 is a rear view of the hinge arrangement of the third embodiment when the gate is in closed position.

Gate 420 is latched in the same way as discussed above in connection with for the second embodiment. A latching assembly 510 is coupled to an upper corner portion of each rear gate 420. Each latching assembly 510 comprises a U-shaped mount 511 coupled at one end to beam 474, and at a second end to a side stanchion 478, 480. Mount 511 extends beyond side stanchion 478, 480 so as to be able to clasp the outboard side of L-shaped pillar 430 when rear gate 420 is attached to sidewalls 412, 414 and placed in a closed position. Latching assemblies 510 further comprise an L-shaped pin 512 and a spring (not shown) which maintains L-shaped pin 512 in a closed position. Latching assemblies 510 are positioned so that L-shaped pins 512 may be received by holes 468 on each of side walls 412, 414. Once gate 420 is securely latched, the square footage available in bed 418 of the pickup is greatly increased, allowing items such as motorcycles, mowers, and other items to be safely retained within the truck bed for transportation.

When so desired, rear gate 420 is easily moved to its opened position by retracting and thereby unlatching L-shaped pins 512, and rotating upper beam 474 outwardly toward the user, until rear gate 420 hangs in a downward, essentially vertical position, as shown in FIG. 19. Any items can then be placed into truck bed 418, or stored items can be easily unloaded, and if necessary, rear gate 420 can slide forward to the position shown in FIG. 20, wherein it will be removed from possible interference with a ramp or other device used to unload the items.

Later removal of extension 400 is easily accomplished. For removal, rear gate 420 is first unlatched, and rotated downwardly until it is substantially parallel to the ground, but inclined slightly upwardly with respect to pickup tailgate 422. Rear gate 420 is then pushed forward so that hooking fingers 504 of L-shaped hooking pins 500 are allowed to pass through the outer loop portion 464 of retaining member 460. Once hooking pins 500 are past outer loop portion 464, rear gate 420 is disengaged from side walls 412, 414.

To release side walls 412, 414, the handle on tailgate 422 is actuated to thereby disengage latches 442 from the outwardly extending rods 445 on the downwardly projecting mounts 444. Once this is accomplished, side walls 412, 414 may simply be lifted up until the enlarged heads on each extending post 456 are adjacent receiving holes 454 and are removed therethrough, thereby detaching side walls 412, 414 from tailgate 422 and returning tailgate 422 to normal operation in either its latched or unlatched position.

Truck bed extensions 10,200 and 400 are each capable of being mounted to a pickup truck without the need for installing additional hardware. In addition, they are all relatively easily mounted, and can be stored without requiring large storage areas. Further, hinge assembly 410 of truck bed extension 400 allows gate 420 to be retracted toward the truck bed 418 to assist in loading and unloading cargo from the truck bed 418 and expansion area. Thus, it will be understood that, although preferred forms of the invention have been described above, it is to be recognized that such disclosure is by way of illustration only, and should not be utilized in a limiting sense in interpreting the scope of the present invention.

Modifications to the exemplary embodiments, as hereinabove set forth, could be readily made by those skilled in the art without departing from the spirit of the present invention. For example, if necessary to conform to the hardware on a particular pickup truck design, the mating hardware on the truck bed extensions can be changed so as to conform to a particular pickup truck's bed wall and tailgate hardware, so as to permit the coupling of the truck bed extension to the pickup truck without additional hardware. In addition, the rear gate could be mounted to swing horizontally instead of vertically, the fastening member could be a clasp or padlock, and the side walls and rear gate could be molded of synthetic resin, glass reinforced resin, carbon fiber or other lightweight and rigid materials.

What is claimed is:

1. A truck bed extender for a pickup truck with a tailgate, said bed extender comprising:

a pair of opposed, substantially upright, longitudinally extending side walls, each side wall including a top having opposed ends thereof, a bottom having opposed ends thereof, a front edge extending between the top and bottom, and a rear edge extending between the top and bottom;

a gate including a top having opposed ends thereof, a bottom having opposed ends thereof, and a pair of sides extending therebetween;

a mounting member positioned adjacent a front edge of at least one side wall and adapted to removably engage a back end of the pickup truck;

a first hinge assembly coupled with the bottom of one of said side walls adjacent the rear edge, the first hinge assembly including a first retaining member; and a first substantially L-shaped pin, said first pin being adjacent one of the opposed ends of the gate bottom and extending outwardly therefrom, said first pin further having a proximate end and a distal end, wherein the distal end is adapted to be received and engaged by the first retaining member to thereby swingably couple the gate between the opposed side walls.

2. A truck bed extender for a pickup truck with a tailgate, said bed extender comprising:

a pair of opposed, substantially upright, longitudinally extending side walls, each side wall including a ton having opposed ends thereof, a bottom having opposed ends thereof, a front edge extending between the top and bottom, and a rear edge extending between the top and bottom;

a gate including a top having opposed ends thereof, a bottom having opposed ends thereof, and a pair of sides extending therebetween;

a mounting member positioned adjacent a front edge of at least one side wall and adapted to removably engage a back end of the pickup truck;

a first hinge assembly coupled with the bottom of one of said side walls adjacent the rear edge, the first hinge assembly including a first retaining member, said first retaining member having an outwardly extending loop portion; and a first pin adjacent one of the opposed ends of the gate bottom and extending outwardly therefrom, said first pin further having a proximate end and a distal end, wherein the distal end is received and engaged by said outwardly extending loop portion of the first retaining member to swingably couple said one end of the gate between the opposed side walls.

3. A truck bed extender for a pickup truck with a tailgate, said bed extender comprising:

a pair of opposed, substantially upright, longitudinally extending side walls, each side wall including a top having opposed ends thereof, a bottom having opposed ends thereof, a front edge extending between the top and bottom, and a rear edge extending between the top and bottom;

a gate including a top having opposed ends thereof, a bottom having opposed ends thereof, and a pair of sides extending therebetween;

a mounting member positioned adjacent a front edge of at least one side wall and adapted to removably engage a back end of the pickup truck;

a first hinge assembly coupled with the bottom of one of said side walls adjacent the rear edge, the first hinge assembly including a first retaining member;

a first pin adjacent one of the opposed ends of the gate bottom and extending outwardly therefrom, said first pin further having a proximate end and a distal end, wherein the distal end is received by said first retaining member to swingably couple said one end of the gate between the opposed side walls; and said first retaining member including a slide bar portion adapted to allow forward and rearward movement of the first pin when the first pin is engaged by the first retaining member.

4. The truck bed extender of claim 3, wherein the first retaining member includes a forward stop to limit the forward movement of the first pin, and a back stop to limit the rearward movement of the first pin.

5. The truck bed extender of claim 1, wherein the mounting member comprises a vertical flange having a slot with a receiving hole at one end thereof, with the diameter of the receiving hole being larger than the width of the slot.

6. A truck bed extender for a pickup truck with a tailgate, said bed extender comprising:

a pair of opposed, substantially upright, longitudinally extending side walls, each side wall including a top having opposed ends thereof, a bottom having opposed ends thereof, a front edge extending between the top and bottom, and a rear edge extending between the top and bottom;

a gate including a top having opposed ends thereof, a bottom having opposed ends thereof, and a pair of sides extending therebetween;

a mounting member positioned adjacent a front edge of at least one side wall and adapted to removably engage a back end of the pickup truck;

a first hinge assembly coupled with the bottom of one of said side walls adjacent the rear edge, the first hinge assembly including a first retaining member;

a first pin adjacent one of the opposed ends of the gate bottom and extending outwardly therefrom, said first pin further having a proximate end and a distal end, wherein the distal end is received by said first retaining member to swingably couple said one end of the gate between the opposed side walls; and a downwardly extending mount positioned on each side wall, each of said mounts extending below the bottom of each side wall and having a rod oriented to extend inwardly therefrom, wherein each rod is adapted to be snapped in to a tailgate latch on the pickup truck.

7. The truck bed extender of claim 1, wherein the bottom of each side wall is longer than the height of the tailgate.

8. The truck bed extender of claim 1, comprising at least one latching assembly positioned adjacent an opposed end of the gate top, and adapted to releasably secure the gate to an adjacent side wall in a closed, essentially upright orientation.

9. The truck bed extender of claim 1, comprising:

a second hinge assembly having a second retaining member at the bottom of the other of said side walls; and a second pin on the other end of the gate bottom extending outwardly therefrom and being received by said second retaining member of said second hinge assembly.

10. The truck bed extender of claim 1, comprising at least one latching assembly positioned adjacent an opposed end of the gate top, and adapted to releasably secure the gate to an adjacent side wall in a closed, essentially upright orientation.

11. The truck bed extender of claim 2, comprising:

a second hinge assembly having a second retaining member at the bottom of the other of said side walls; and a second pin on the other end of the gate bottom extending outwardly therefrom and being received by said second retaining member of said second hinge assembly.

12. The truck bed extender of claim 3, comprising at least one latching assembly positioned adjacent an opposed end of the gate top, and adapted to releasably secure the gate to an adjacent side wall in a closed, essentially upright orientation.

13. The truck bed extender of claim 3, comprising:

a second hinge assembly having a second retaining member at the bottom of the other of said side walls; and a second pin on the other end of the gate bottom extending outwardly therefrom and being received by said second retaining member of said second hinge assembly.

14. The truck bed extender of claim 6, comprising at least one latching assembly positioned adjacent an opposed end of the gate top, and adapted to releasably secure the gate to an adjacent side wall in a closed, essentially upright orientation.

15. The truck bed extender of claim 6, comprising:

a second hinge assembly having a second retaining member at the bottom of the other of said side walls; and a second pin on the other end of the gate bottom extending outwardly therefrom and being received by said second retaining member of said second hinge assembly.

* * * * *